US010997029B2

(12) United States Patent
Garza et al.

(10) Patent No.: US 10,997,029 B2
(45) Date of Patent: May 4, 2021

(54) CORE REPAIR WITH FAILURE ANALYSIS AND RECOVERY PROBE

(71) Applicant: INTERNATIONAL BUSINESS MACHINES CORPORATION, Armonk, NY (US)

(72) Inventors: Rocio Yolanda Garza, Round Rock, TX (US); Tony Sawan, Round Rock, TX (US); Saurabh Chadha, Bangalore (IN); Diyanesh B. Chinnakkonda Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 16/296,034

(22) Filed: Mar. 7, 2019

(65) Prior Publication Data
US 2020/0285540 A1    Sep. 10, 2020

(51) Int. Cl.
*G06F 11/00*     (2006.01)
*G06F 11/14*     (2006.01)
*G06F 11/07*     (2006.01)

(52) U.S. Cl.
CPC ...... *G06F 11/1428* (2013.01); *G06F 11/0724* (2013.01); *G06F 11/0793* (2013.01); *G06F 11/1425* (2013.01); *G06F 11/1441* (2013.01)

(58) Field of Classification Search
CPC ............. G06F 11/3648; G06F 11/0724; G06F 11/2294; G06F 11/0748; G06F 11/3058;
(Continued)

(56) References Cited

U.S. PATENT DOCUMENTS 5,425,036 A  *  6/1995  Liu ........................ G06F 30/331
                                                      714/735
5,600,229 A  *  2/1997  Oh ...................... G01R 31/3648
                                                      320/162
(Continued)

FOREIGN PATENT DOCUMENTS

CN           101377750 B    10/2010

OTHER PUBLICATIONS

Tang, "A Multi-Core Debug Platform for NoC-Based Systems" 2007, the Chinese Universe of Hong Kong, pp. 1-6 (Year: 2007).*
(Continued)

*Primary Examiner* — Bryce P Bonzo
*Assistant Examiner* — Jeison C Arcos
(74) *Attorney, Agent, or Firm* — Kunzler Bean & Adamson; Bruce R. Needham

(57) ABSTRACT

An apparatus for core repair includes a failure analysis and recovery ("FAR") probe that accesses a core of a processor and units of the core over a low-level communication bus while the core is operational after a failure notification. The FAR probe compares operational data of the core versus vital product data ("VPD") while the core is running tests and a thermal, power, functional ("TPF") workload to determine if the core is in a degraded state and runs tests to identify a failure after determining that the core is in a degraded state. The FAR probe adjusts parameters of the core in response to identifying a failure of the core and re-evaluates the core to determine if the core is functional. The FAR probe returns the core to service after determining that the core is functional. The FAR probe operates independent of other processor cores while the cores are operational.

20 Claims, 5 Drawing Sheets

(58) Field of Classification Search
CPC .............. G06F 11/3656; G06F 11/348; G06F 11/3466; G06F 11/3664; G01R 31/31705; G01R 31/3177
See application file for complete search history.

(56) References Cited

U.S. PATENT DOCUMENTS

| | | | | |
|---|---|---|---|---|
| 6,154,856 | A * | 11/2000 | Madduri | G06F 11/348 712/227 |
| 6,760,898 | B1 * | 7/2004 | Sanchez | G01R 31/318519 716/111 |
| 6,851,071 | B2 | 2/2005 | Bossen et al. | |
| 7,062,685 | B1 * | 6/2006 | Plofsky | G01R 31/31851 714/47.3 |
| 7,134,047 | B2 | 11/2006 | Quach | |
| 8,074,110 | B2 | 12/2011 | Vera et al. | |
| 8,321,163 | B2 * | 11/2012 | Ewing | G01R 21/10 702/60 |
| 8,850,262 | B2 | 9/2014 | Cardinell et al. | |
| 8,984,335 | B2 | 3/2015 | Anandavally et al. | |
| 2002/0091494 | A1 * | 7/2002 | Kudo | G06F 11/3656 702/119 |
| 2002/0188877 | A1 * | 12/2002 | Buch | G06F 1/329 713/320 |
| 2005/0044319 | A1 * | 2/2005 | Olukotun | G06F 9/30047 711/118 |
| 2006/0106503 | A1 * | 5/2006 | Lamb | H02J 3/14 700/299 |
| 2007/0016827 | A1 * | 1/2007 | Lopez, Jr. | G06F 11/2294 714/31 |
| 2007/0174679 | A1 * | 7/2007 | Chelstrom | G06F 11/2236 714/6.13 |
| 2007/0214389 | A1 * | 9/2007 | Severson | G06F 11/3656 714/30 |
| 2007/0220352 | A1 * | 9/2007 | Hernandez | G01R 31/3177 714/39 |
| 2008/0148269 | A1 * | 6/2008 | Wong | G06F 9/5072 718/104 |
| 2008/0282087 | A1 * | 11/2008 | Stollon | G01R 31/31719 713/171 |
| 2008/0313312 | A1 * | 12/2008 | Flynn | G06F 3/0613 709/221 |
| 2009/0063898 | A1 | 3/2009 | Eisen et al. | |
| 2009/0094481 | A1 * | 4/2009 | Vera | G06F 1/206 714/11 |
| 2009/0249094 | A1 * | 10/2009 | Marshall | G06F 1/3203 713/320 |
| 2012/0060140 | A1 * | 3/2012 | Kwan | G01R 31/318357 716/136 |
| 2012/0166880 | A1 * | 6/2012 | Greb | G06F 11/26 714/37 |
| 2013/0031420 | A1 * | 1/2013 | Haverkamp | G06F 11/3656 714/45 |
| 2014/0025991 | A1 | 1/2014 | Anandavally et al. | |
| 2014/0304399 | A1 * | 10/2014 | Chaudhary | H04L 41/5009 709/224 |
| 2015/0169382 | A1 * | 6/2015 | Anderson | G06F 9/5094 718/104 |
| 2015/0226795 | A1 * | 8/2015 | Hopkins | G06F 11/3648 714/726 |
| 2015/0226801 | A1 * | 8/2015 | Hopkins | G01R 31/31725 714/731 |
| 2016/0179825 | A1 * | 6/2016 | Bertin | G06F 16/219 707/668 |
| 2016/0314057 | A1 | 10/2016 | De Oliveira et al. | |
| 2017/0357311 | A1 | 12/2017 | Hovis et al. | |
| 2018/0080984 | A1 * | 3/2018 | Tsuboi | G06F 11/08 |
| 2018/0357108 | A1 * | 12/2018 | Mullender | G06F 3/0613 |
| 2020/0278935 | A1 * | 9/2020 | Borikar | G06F 12/1027 |

OTHER PUBLICATIONS

Leatherman, "An embedded debugging architecture for SoCs" 2005, IEEE, pp. 1-5 (Year: 2005).*

Salfner, "Cross-Core Event Monitoring for Processor Failure Prediction" 2009, IEEE, pp. 67-73 (Year: 2009).*

* cited by examiner

CORE REPAIR WITH FAILURE ANALYSIS AND RECOVERY PROBE

BACKGROUND

The subject matter disclosed herein relates to core repair and more particularly relates to core repair with a failure analysis and recovery probe.

In multi-core processors with spare cores and error detection mechanisms, defective cores are often categorized as either recoverable or non-recoverable. Cores with recoverable errors are sometimes healed by a recovery process that will reset the core back to a good architectural state. Non-recoverable cores are fenced off, and in some cases, a spare core will be used. In these scenarios, typically steps are taken to reset a core or deploy a spare core. Firmware based diagnostics might take place during operation or on system reboot to report fail signature or impacted cores. It is difficult to recover bad cores during live operation or repair beyond normal conditions, without extensive diagnostics to root cause the issue and repair the defective core.

SUMMARY

An apparatus for core repair is disclosed. A method and system also perform the functions of the apparatus. According to an embodiment of the present invention, the apparatus for core repair includes a failure analysis and recovery ("FAR") probe that accesses a core of a processor and units of the core over a low-level communication bus while the core is operational in response to a failure notification regarding one or more of the core and a unit of the core. The FAR probe compares operational data present in the core versus vital product data ("VPD") of the core while the core is running tests and a thermal, power and functional ("TPF") load to determine if the core is in a degraded state and runs one or more tests to identify a failure in response to determining that the core is in a degraded state. The FAR probe adjusts one or more parameters of the core in response to a test identifying a failure of the core and re-evaluates the core to determine if the core is functional. The FAR probe returns the core to service in response to determining that the core is functional. The FAR probe operates independent of cores of the processor while the cores of the processor are operational.

A method for core recovery includes accessing a core of a processor and units of the core over a low-level communication bus while the core is operational in response to a failure notification regarding one or more of the core and a unit of the core and comparing operational data present in the core versus VPD of the core while the core is running tests and a TPF workload to determine if one or more of the core is in a degraded state. The method includes running one or more tests to identify a failure in response to determining that the core is in a degraded state, adjusting one or more parameters of the core in response to a test identifying a failure of the core, re-evaluating the core to determine if the core is functional, and returning the core to service in response to determining that the core is functional. A FAR probe executing the method operates independent of cores of the processor while the cores of the processor are operational.

A system for core repair includes a processor with two or more cores, memory accessible by the processor, where the processor and memory are configurable in logical partitions accessible by a client, pervasive logic within the processor, and a FAR probe external to the processor that accesses the cores of the processor via the pervasive logic. The FAR probe accesses a core of a processor and units of the core over a low-level communication bus of the pervasive logic while the core is operational in response to a failure notification regarding one or more of the core and a unit of the core. The FAR probe compares operational data present in the core versus VPD of the core while the core is running tests and a TPF workload to determine if one or more of the core is in a degraded state. The FAR probe runs one or more tests to identify a failure in response to determining that the core is in a degraded state, adjust one or more parameters of the core in response to a test identifying a failure of the core, re-evaluate the core to determine if the core is functional, return the core to service in response to determining that the core is functional. The FAR probe operates independent of cores of the processor while the cores of the processor are operational.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
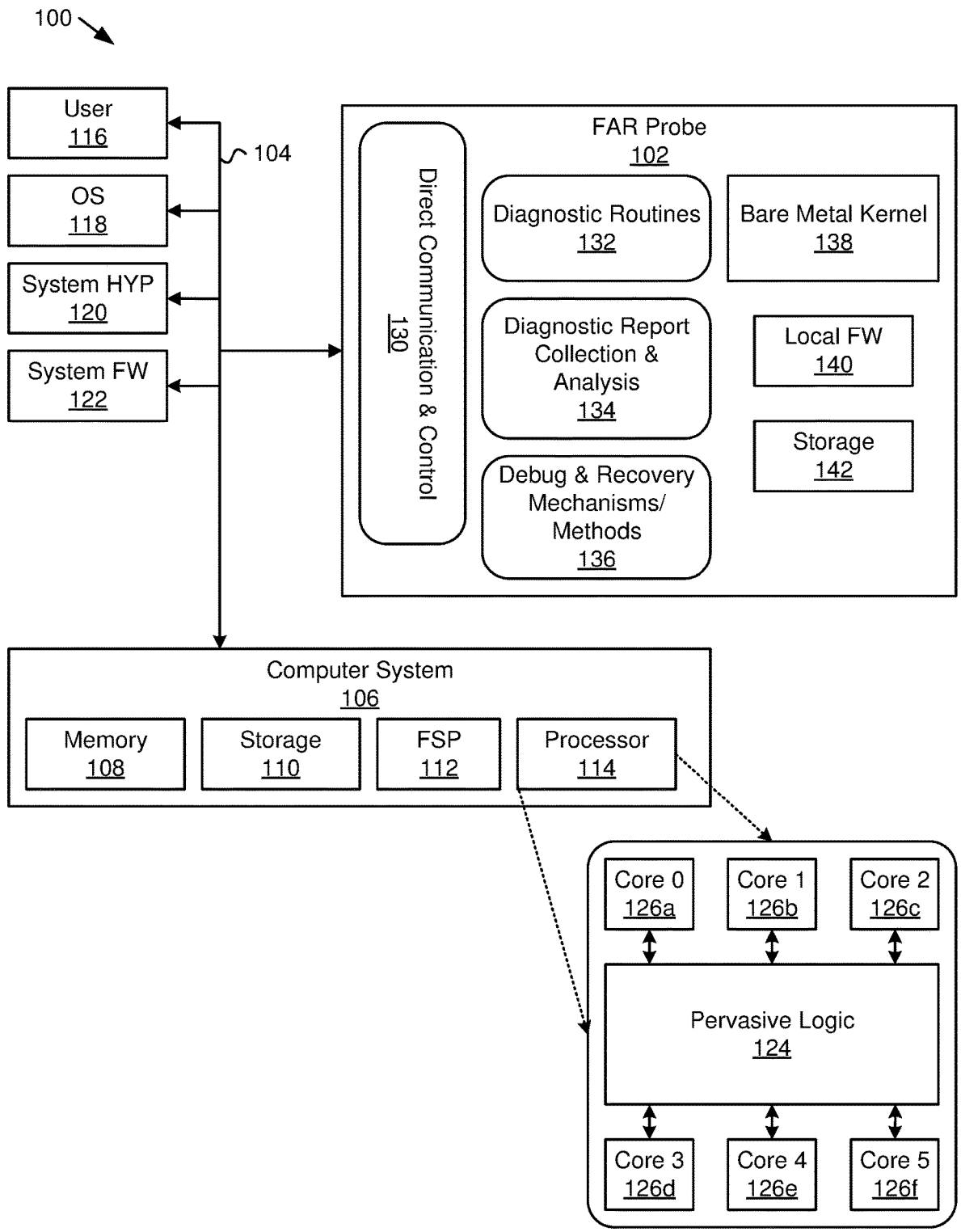
FIG. 1 is a schematic block diagram illustrating one embodiment of a system for core repair.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system and/or a method and may include a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a portion of a failure analysis and recovery ("FAR") probe, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as a FAR probe, in order to more particularly emphasize their implementation independence. For example, a FAR probe may be implemented as a hardware circuit comprising custom VLSI circuits or gate arrays, off-the-shelf semiconductors such as logic chips, transistors, or other discrete components. At least a portion of a FAR probe may also be implemented in programmable hardware devices such as field programmable gate arrays, programmable array logic, programmable logic devices or the like.

A portion of a FAR probe may also be implemented in software for execution by various types of processors. An identified portion of a FAR probe that includes program instructions may, for instance, comprise one or more physical or logical blocks of computer instructions which may, for instance, be organized as an object, procedure, or function. Nevertheless, the executables of an identified FAR probe need not be physically located together, but may comprise disparate instructions stored in different locations which, when joined logically together, comprise a portion of the FAR probe and achieve the stated purpose for the FAR probe.

The description of elements in each figure may refer to elements of proceeding figures. Like numbers refer to like elements in all figures, including alternate embodiments of like elements.

An apparatus for core repair includes a FAR probe that accesses a core of a processor and units of the core over a low-level communication bus while the core is operational in response to a failure notification regarding one or more of the core and a unit of the core. The FAR probe compares operational data present in the core versus vital product data ("VPD") of the core while the core is running tests and a thermal, power and functional ("TPF") workload to determine if the core is in a degraded state and runs one or more tests to identify a failure in response to determining that the core is in a degraded state. The FAR probe adjusts one or more parameters of the core in response to a test identifying a failure of the core and re-evaluates the core to determine if the core is functional. The FAR probe returns the core to service in response to determining that the core is functional. The FAR probe operates independent of cores of the processor while the cores of the processor are operational.

In some embodiments, the FAR probe returns the core to partial service and updates the VPD in response to the FAR probe adjusting the one or more parameters of the core and determining that the core is partially functional, and fencing off one or more components of the core deemed non-functional. In other embodiments, the FAR probe fences off the core and updates the VPD in response to the FAR probe adjusting the one or more parameters of the core and determining that the core is non-functional. In other embodiments, the FAR probe returns the core to service in response to running the one or more tests and determining that the core is not in a degraded state.

In some embodiments, the degraded state includes the operational data present in the core being outside of manufacturing limits in the VPD, the operational data present in the core being outside a guard band in the VPD, determining that the core is in a failed state, and/or determining that a unit in the core is in a failed state. In other embodiments, the one or more tests may include tuning a voltage and/or a frequency of the core to achieve a functional dynamic voltage frequency slewing ("DVFS") point or adjusting temperature and/or power while tuning a voltage and/or a frequency of the core to achieve a functional DVFS point. The one or more tests may include running a test based on a failure signature present in the failure notification and/or a failure signature identified when determining if the core is in a degraded state, measuring, under a specific workload, circuit timing of a unit in the core to identify a critical timing path, and measuring voltages of the core to identify a voltage deficit with respect to a known critical path limiter. The one or more tests may include running an architected verification pattern ("AVP") test, running a logic built in self test ("ABIST"), or running an architect-targeted low-level test. In other embodiments, re-evaluating the core includes re-running a specific test that identified the failure after adjustment of the one or more parameters to determine if the identified failure is still present and/or evaluating the core versus VPD while running the TPD workload to determine if the core is no longer in the degraded state.

In some embodiments, the FAR probe accesses the core in bare metal mode using a bare metal kernel. In other embodiments, the low-level communication bus is independent of a communication bus used by the processor to service client workloads. In other embodiments, adjusting the one or more parameters of the core includes adjusting one or more guard bands of the core. In other embodiments, the FAR probe reassigns workloads assigned for execution by the core identified in the failure notification to be executed by a different core while the FAR probe determines if the core identified in the failure notification can be returned to service.

In some embodiments, the FAR probe accesses the core, compares data, runs one or more tests, adjust parameters, re-evaluates the core and returns the core to service without re-booting the core. In other embodiments, comparing operational data present in the core versus the VPD includes evaluating a power budget, evaluating operation with respect to a guard band, evaluating operational data of the core with respect to manufacturing limits in the VPD, evaluating timing of the core, evaluating frequency of the core, evaluating voltage of the core, and/or evaluating temperature of the core. In other embodiments, the FAR probe accesses a state machine and/or a control register through pervasive logic to compare the operational data present in the core versus the VPD, run the one or more tests, adjust the one or more parameters and/or re-evaluate the core. In other embodiments, the FAR probe accesses the core identified in the failure notification using a hardware interface.

A method for core recovery includes accessing a core of a processor and units of the core over a low-level communication bus while the core is operational in response to a failure notification regarding one or more of the core and a unit of the core and comparing operational data present in the core versus VPD of the core while the core is running tests and a TPF workload to determine if one or more of the core is in a degraded state. The method includes running one or more tests to identify a failure in response to determining that the core is in a degraded state, adjusting one or more parameters of the core in response to a test identifying a failure of the core, re-evaluating the core to determine if the core is functional, and returning the core to service in response to determining that the core is functional. A FAR probe executing the method operates independent of cores of the processor while the cores of the processor are operational.

In some embodiments, the method includes returning the core to partial service and updating the VPD in response to adjusting the one or more parameters of the core and determining that the core is partially functional and fencing off one or more components of the core deemed non-functional. In other embodiments, the method includes fencing off the core and updating the VPD in response to adjusting the one or more parameters of the core and determining that the core is non-functional. In other embodiments, the method includes returning the core to service in response to running the one or more tests and determining that the core is not in a degraded state.

A system for core repair includes a processor with two or more cores, memory accessible by the processor, where the processor and memory are configurable in logical partitions accessible by a client, pervasive logic within the processor, and a FAR probe external to the processor that accesses the cores of the processor via the pervasive logic. The FAR probe accesses a core of a processor and units of the core over a low-level communication bus of the pervasive logic while the core is operational in response to a failure notification regarding one or more of the core and a unit of the core. The FAR probe compares operational data present in the core versus VPD of the core while the core is running tests and a TPF workload to determine if one or more of the core is in a degraded state. The FAR probe runs one or more tests to identify a failure in response to determining that the core is in a degraded state, adjust one or more parameters of the core in response to a test identifying a failure of the core, re-evaluate the core to determine if the core is functional, return the core to service in response to determining that the core is functional. The FAR probe operates independent of cores of the processor while the cores of the processor are operational.

FIG. 1 is a schematic block diagram illustrating one embodiment of a system 100 for core repair. The system 100, in the depicted embodiment, includes a FAR probe 102, a communication bus 104, and a computer system 106 with memory 108, data storage 110, a flexible service processor 112, and a processor 114, a user 116, an operating system 118, a system hypervisor 120, and system firmware 122. The processor 114 includes pervasive logic 124 connected to several cores 126a-f (collectively or generically "126"). The FAR probe 102, in various embodiments, includes direct communication and control 130, diagnostic routines 132, diagnostic report collection and analysis 134, debug and recovery mechanisms and methods 136, a bare metal kernel 138, local firmware 140, and/or data storage 142. The elements of the system 100 are described below.

The system 100 includes FAR probe 102 that accesses the cores 126 of the processor 114 in a bare metal mode. The bare metal mode allows access to the inner workings of the cores 126, such as control registers, state machines, bits, busses, logic, and the like at a level where low-level diagnostics may be run. For example, the FAR probe 102 accesses a state machine, a control register, etc. through pervasive logic to compare the operational data present in the core versus data in the VPD, the run the one or more tests, to adjust the one or more parameters and/or to re-evaluate the cores 126. In other embodiments, the FAR probe 102 accesses a core 126 identified in the failure notification using a hardware interface. In one embodiment, the FAR probe 102 accesses a core 126 using the bare metal kernel 138 over a low-level communication bus within the pervasive logic 124, which allows access to the core 126 while the core 126 is operational. The FAR probe 102 may also use the communication bus 104 to access the computer system 106 through which the FAR probe 102 then accesses the low-level communication bus in the pervasive logic 124.

In some embodiments, the FAR probe 102 is positioned to directly access the low-level communication bus. The low-level communication bus in the pervasive logic 124 allows access to a core 126 at a level capable of running testing typically done during manufacturing to qualify a core, to identify bugs, to identify failures, to configure the core 126, etc. The low-level communication bus, in some embodiments, is in addition to other communication buses used for execution of commands, reading data, writing data, etc. associated with running workloads for clients. For example, the low-level communication bus may be a serial interface, side bus, etc. and can communicate with the FAR probe 102. In some embodiments, the low-level communication bus in the pervasive logic 124 is a communication capability that is in addition to memory buses, data busses, etc. used for executing code, accessing data, etc. for client workloads. In some embodiments, the term "low-level communication bus" is synonymous with "pervasive logic."

In some embodiments, the FAR probe 102 communicates with the computer system 106, processor 114, pervasive logic 124, cores 126, etc. through a baseboard management controller ("BMC") and associated communication bus. In some embodiments, at least a portion of the FAR probe 102 executes on a BMC. In other embodiments, at least a portion of the FAR probe 102 is on another server, computer, etc. that has access to the computer system 106. In some embodiments, the FAR probe 102 is located to have direct access to the pervasive logic 124 without going through another communication bus.

The computer system 106 includes one or more processors 114 and at least one processor 114 includes multiple cores 126 and pervasive logic 124. In some embodiments, the computer system 106 is a computing device sold together as a unit. In other embodiments, the computer system 106 includes multiple computing devices. In other embodiments, elements of the computer system 106 are separate and may be combined to function together, such as in a rack, data center, etc. The computer system 106, in some embodiments, is partitionable in one or more logical partitions ("LPARs") where each LPAR may run an instance of an operating system and is configurable to execute workloads for a client. The computer system 106 may be a server farm, data center, a cloud computing environment, and the like. The computer system 106 includes memory 108, which may be accessible to the processor 114 and may include random-access memory ("RAM"), read-only memory ("ROM"), flash memory, cache, etc. The computer system 106, in some embodiments, includes data storage 110, such as a hard disk drive, flash memory, optical memory, tape storage, and the like. In other embodiments, the data storage 110 is accessible to the computer system 106 and may be a storage area network ("SAN") or the like.

The computer system 106, in some embodiments, include a flexible service processor ("FSP") 112, which may include firmware that provides diagnostics, initialization, configuration, run-time error detection and correction, and the like. In some embodiments, the FAR probe communicates with the FSP 112 to update, load, run, etc. diagnostic routines 132, to update vital product data ("VPD"), to update the firmware in the FSP 112, etc. In other embodiments, the computer system 106 does not include an FSP 112, but instead has equivalent capabilities in other elements, such as firmware.

The system 100 is accessible by a user 116, for example through a client interface. The user 116 may receive a failure notification of a failure of a core (e.g. 126a), may interact with the FAR probe 102, may perform system administrator functions, and the like. Note that the first core 126a is used as the core identified in a failure notification throughout, but that any of the other cores 126*b-f* could also be identified in a failure notification. While a single core 126*a* is cited herein, the FAR probe 102 and methods 300, 400 described herein also cover failures of two or more cores 126 and/or the processor 114. In addition, a failure signature is not limited to a single core and may include a failure signature of two or more cores 126*a*. In addition, a core (e.g. 126*a*) may include a small core, a large core or a super-core that includes two or more small cores, and the like.

The system 100 includes one or more operating systems 118. For example, one instance of an operating system 118 may be used by the computer system 106 for controlling the processor 114, for executing client workloads, etc. In other embodiments, an operating system 118 is available for configuring an LPAR. In some embodiments, LPARs may run different operating systems 118. In some embodiments, the one or more operating systems 118 are stored and are accessible to the computer system 106 over the communication bus 104. In other embodiments, the computer system 106 stores a local copy of an operating system 118.

In some embodiments, the system 100 includes a system hypervisor 120 such as a power hypervisor. The system hypervisor 120 may perform any number of functions, such as controlling time slicing of operations or routines associated with the cores 126, managing interrupts (e.g., hardware interrupts), re-allocating resources across one or more systems or platforms, dispatching workloads, and the like.

The system 100, in some embodiments, includes system firmware 122 accessible over the communication bus 104. For example, the system firmware 122 may be used for initialization, configuring the computer system 106, diagnostics, etc. In some embodiments, the FAR probe 102 accesses the system firmware 122 to run tests, diagnostic routines, etc.

The communication bus 104 is a digital telecommunication network which allows the FAR probe 102, the computer system 106, a user 116, etc. to communicate and share resources. Computing devices use the communication bus 104 to exchange data over cable media, such as wires, optical fiber, etc. or over wireless media, such as WiFi or other wireless protocol. The communication bus 104 may include network hardware, such as switches, modems, servers, etc. The communication bus 104, in some embodiments, includes more than one computer network and in some embodiments includes the Internet. Computer networks of the communication bus 104 may include one or more communication protocols, such as peripheral component interconnect express ("PCIe"), Infiniband ("IB"), a serial bus, a BMC protocol, etc. One of skill in the art will recognize other elements of the communication bus 104 for communication between elements of the system 100.

The FAR probe 102, in some embodiments, includes one or more diagnostic routines 132, which may be also called herein "tests." For example, the diagnostic routines 132 may include tests for diagnosing failures within a core 126. For example, the FAR probe 102 may run a diagnostic routine 132 to compare data present in a core (e.g. 126*a*) versus VPD of the core 126*a* while the core 126*a* is running a thermal design point ("TPD") workload to determine if the core 126*a* is in a degraded state. In another embodiment, the FAR probe 102 may run a run a diagnostic routine 132 to run one or more tests to identify a failure in response to determining that the core 126*a* is in a degraded state. In another embodiment, the FAR probe 102 may run a run a diagnostic routine 132 to re-evaluate the core 126*a* to determine if the core 126*a* is functional. The FAR probe 102 may re-evaluate the core 126*a*, adjust parameters, re-evaluate the core 126*a* again, and may repeat this process until defects are corrected in units or the core 126*a* is deemed non-functional or partially functional. In other embodiments, the FAR probe 102 accesses diagnostic routines 132 from the system firmware 122 or from the FSP 112 for diagnostics.

The FAR probe 102, in some embodiments, includes a function for diagnostic report collection and analysis 134. For example, the FAR probe 102 determines if the core is in a degraded state and generates a diagnostic report detailing results of testing. The FAR probe 102 may also analyze diagnostic reports to determine if the core 126*a* is in a degraded state, determine if a unit of the core 126*a* has failed, to evaluate if the core 126*a* is functional after testing, and the like. A unit of the core 126*a* includes various logic and circuits units inside the core 126*a*, including data cache, instruction cache, a floating point unit, a vector unit, a sequence unit, and the like. The FAR probe 102, in some embodiments, includes debug and recovery mechanisms and methods 136, which includes various mechanisms and methods to repair a core 126. In some embodiments, the debug and recovery mechanisms and methods 136 are stored in the FAR probe 102. In other embodiments, the debug and recovery mechanisms and methods 136 are accessible to the FAR probe 102. After identifying a degradation, failure, etc., the FAR probe 102 uses the debug and recovery mechanisms and methods 136 to attempt to repair a core 126.

The FAR probe 102 includes, in some embodiments, a bare metal kernel 138 is kernel-level instructions that access a core (e.g. 126*a*) in bare metal mode for diagnosis and testing of a core failure. The bare metal kernel, in some embodiments, allows access to the core 126*a* at a low level to access control registers, state machines, and other hardware circuit for testing, such as testing similar to qualification testing by a manufacturer.

In some embodiments, the FAR probe 102 includes local firmware 140 and/or data storage 142. The local firmware 140, in some embodiments, includes instructions, diagnostic routines 132, etc. used by the FAR probe 102. The data storage 142, may include diagnostic reports, analysis, diagnostic routines 132, and/or other information used by the FAR probe 102. In other embodiments, the FAR probe 102 access other data storage for storing information relevant to the FAR probe 102. One of skill in the art will recognize other uses for the local firmware 140 and what can be stored in local firmware 140, system firmware 122, other firmware, and what can be stored in data storage 142, 110 by the FAR probe 102.

Figure 2:
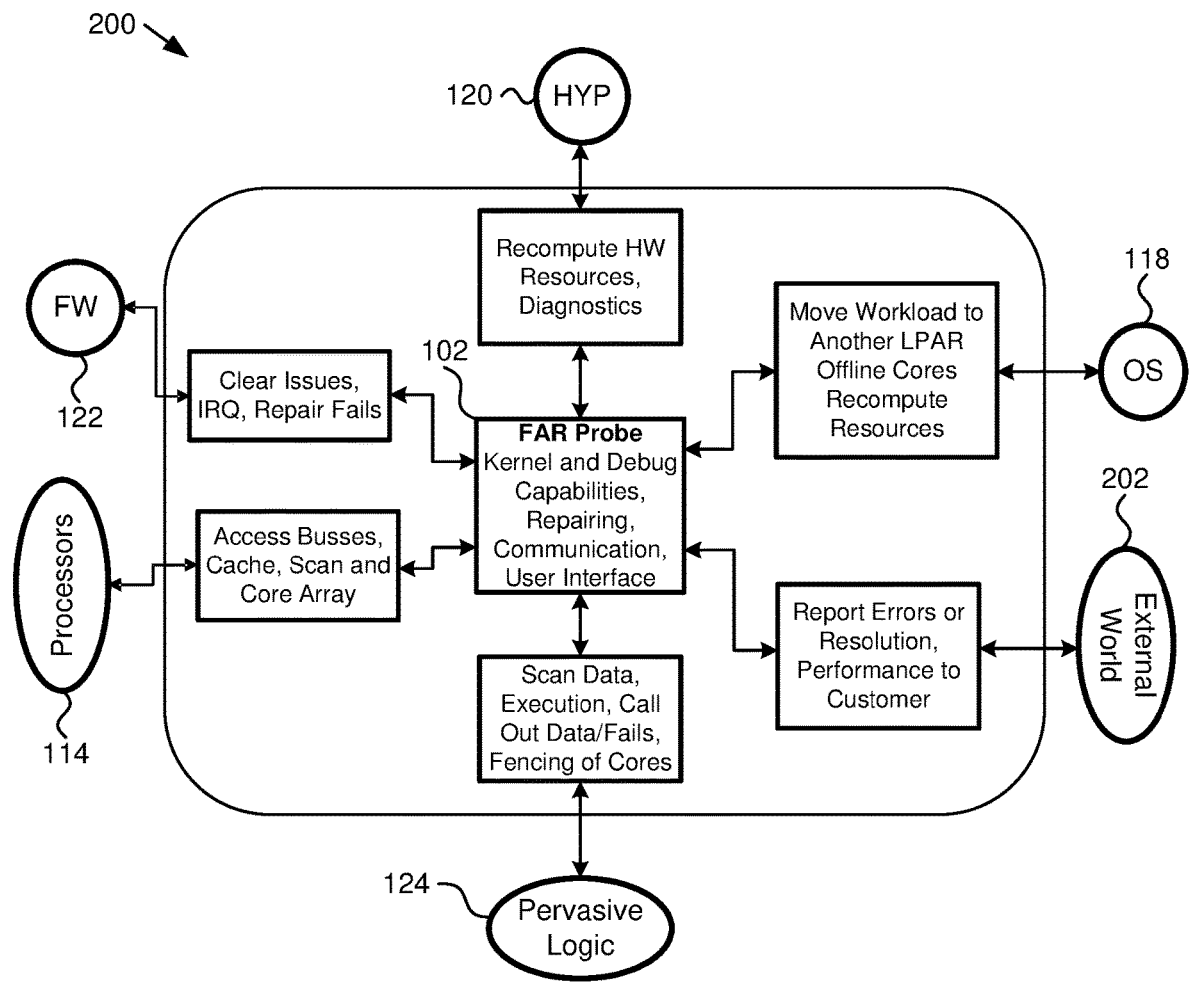
FIG. 2 is a schematic block diagram illustrating one embodiment of a failure analysis and recovery ("FAR") probe for core repair along with communication pathways and functions.

FIG. 2 is a schematic block diagram illustrating one embodiment of a FAR probe 102 for core repair along with communication pathways and functions. The FAR probe 102 includes a bare metal kernel 138 and debug capabilities along with the ability to repair a core 126. The FAR probe 102 include communication capabilities to communicate over the communication bus 104, over the low-level communication bus in the pervasive logic 124, etc. In some embodiments, the FAR probe 102 includes a user interface.

In some embodiments, the FAR probe 102 communicates with the pervasive logic 124 to scan data, execute testing, call out data and failures from the testing, fencing off a failed core (e.g. 126*a*), and the like. The FAR probe 102 communicates with the processor(s) 114 to access busses, cache, etc., to scan a core and core array for issues, etc. The FAR probe 102 accesses the system firmware 122 or other firmware, such as in the FSP 112, to clear issues, interrupt requests, repair failures, and the like.

The FAR probe 102 accesses the system hypervisor 120 to recompute system hardware, resources, diagnostics, and the like. For example, the FAR probe 102 may communicate that a core (e.g. 126*a*) has failed so that the system hypervisor 120 knows to redirect workloads. The FAR probe 102, in some embodiments, communicates with one or more instances of an operating system 118 to move workloads during testing or after a core failure to another LPAR, to communicate offline cores, to recompute resources, etc. The FAR probe 102, in some embodiments, communicates with the outside world 202 through an interface to report errors, to report resolutions such as a repaired core, performance, etc. to a customer, client, system administrator or the like.

Figure 3:
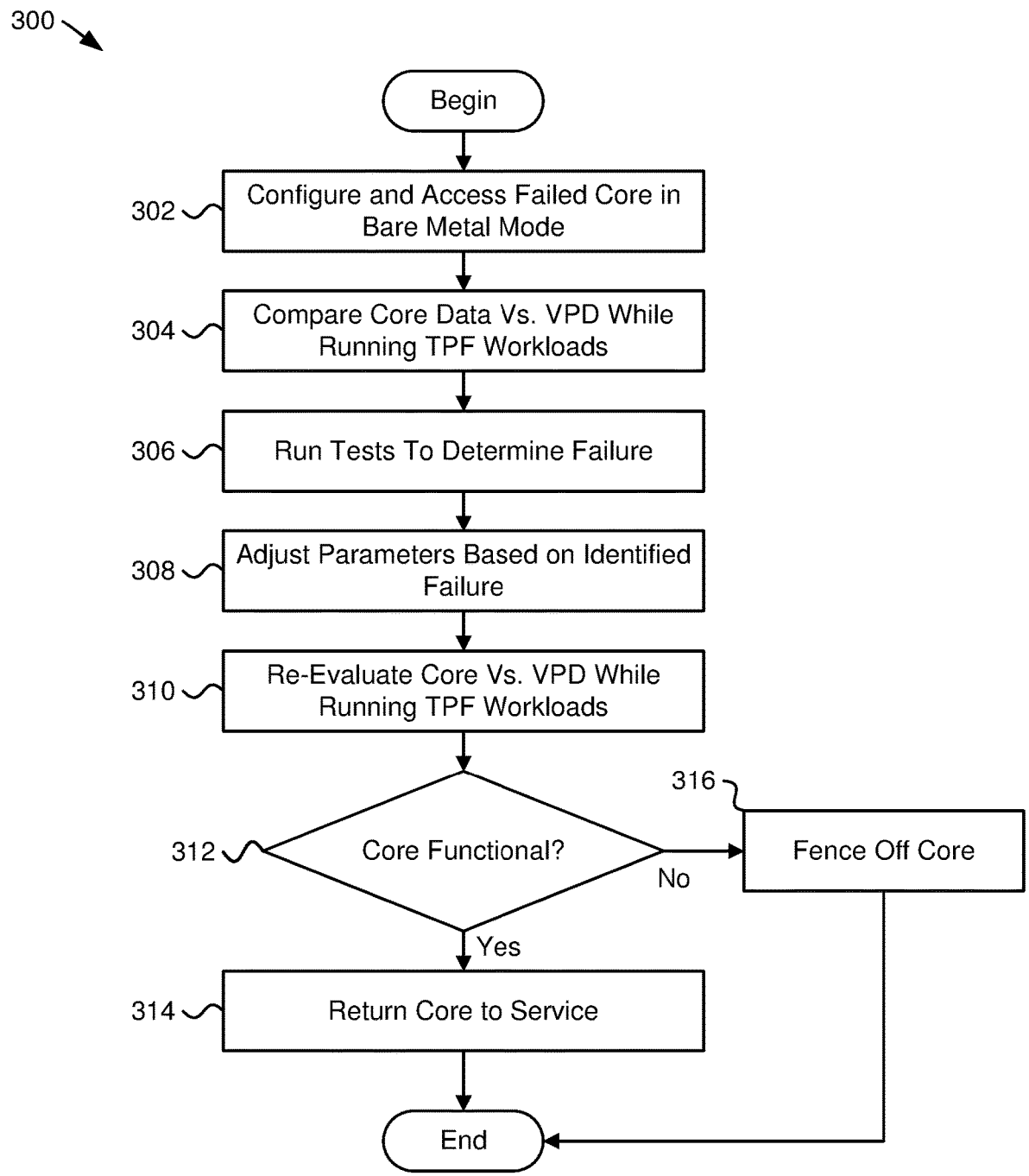
FIG. 3 is a schematic flow chart diagram illustrating one embodiment of a method for core repair using a FAR probe.

FIG. 3 is a schematic flow chart diagram illustrating one embodiment of a method 300 for core repair using a FAR probe 102. The method 300 begins and accesses a core 126*a* of a processor 114 over a low-level communication bus while the core 126*a* is operational in response to a failure notification regarding the core 126*a*. For example, the system hypervisor 120, BMC, or other device may report a failed operation, an interrupt, a failed workload or other failure of a core. The reported failure may be a notification to a system administrator, to a client, etc. One of skill in the art will recognize that a reported failure of a core is detected and sent to the FAR probe 102.

In some embodiments, the failure notification includes a failure signature. The failure signature, in some embodiments, includes data from the reported failed core (e.g. 126*a*), such as statuses from internal state machines, interrupt requests, control register statuses, statuses of certain bits, etc. Typically, a failure signature points to certain types of failures, degradation, issues, etc. which method 300 uses to choose certain tests. For example, a failure signature may indicate that the core is running slow, a frequency is wrong, a voltage is out of spec, and the like. One of skill in the art will recognize other data and information in a failure signature and how to interpret the failure signature.

As stated above, the low-level communication bus, in some embodiments, is part of the pervasive logic 124 in the processor 114. In some embodiments, the low-level communication bus includes pathways to state machines, to control registers, to interrupts, and to other hardware circuits where information useful to the understanding operation of the cores 126. In some embodiments, the pervasive logic 124 is available in particular processors 114, such as some processors from International Business Machines Corporation ("IBM"). Also, as described above, in some embodiments the method 300 accesses the reported failed core 126*a* over the communication bus 104 using the FAR probe 102 where the FAR probe 102 is external to the computer system 106.

The method 300 configures and accesses 302 the failed core 126*a* in the bare metal mode, which is a low-level hardware debug environment/framework. By configuring the failed core 126*a* in the bare metal mode, the method 300 establishes an environment where the reported failed core 126*a* can be tested at a very low level, such as determining timing patterns of circuits, accessing state machines, control registers, etc. another low level testing all while the core 126*a* remains operational. For example, the core 126*a* is operational by running TPF workloads while the method 300 tests units in the core and runs core-level tests.

A power, thermal and functional ("TPF") workload, in some embodiments, is a standard workload used by the manufacturer for testing the core 126*a* and/or processor 114. A TPF workload is a term used herein to include a wide variety of workloads, each designed to test one or more limits, functions, etc. of a core 126*a*. A TPF workload may test a particular operation, function, limit, etc. of the core 126*a*. For example, a particular TPF workload may exercise the core 126*a* in a maximum power condition. Another TPF workload may exercise the core 126*a* in a maximum frequency condition. Other TPF workloads may exercise the core 126*a* at maximum voltage conditions. Other TPF workloads may test multiple parameters, such as voltage, frequency, temperature, etc.

The method 300 and/or FAR probe 102 runs one or more TPF workloads in determining if the core 126 is in a degraded state, if the core 126*a* is functional after adjusting parameters, or other purpose as discussed herein or known to one of skill in the art. In some embodiments, the TPF workload is stored in VPD. In other embodiments, a TPF workload is referenced by the FAR probe 102 and/or VPD and may be loaded as needed. The term "TPF workload" is not intended to be limiting and instead is intended to identify a standard workload used for testing and one of skill in the art will recognize other TPF workloads and other names for a standard workload used by the FAR probe and/or methods 300, 400 for testing the core 126*a*.

The method 300 compares 304 operational data present in the reported failed core 126*a* versus vital product data of the core 126*a* while the core 126*a* is running tests and a TPF workload to determine if the core 126*a* is in a degraded state. In some embodiments, the core 126*a* being in a degraded state includes the operational data present in the core 126*a* being outside of manufacturing limits in the VPD, the operational data present in the core 126*a* being outside a guard band in the VPD, determining that the core 126*a* is in a failed state, determining that a unit in the core 126*a* is in a failed state, and the like.

The VPD includes operational data gathered and stored by the manufacturer during testing, such as manufacturer sort data, data gathered and stored during configuration, and the like. Note that the TPF workload is typically used by manufacturers and others under various thermal and power conditions for finding stable thermal design points, as stable power design points, debugging tests, etc.

The method 300 operates the reported failed core 126*a* under TPF workload and other similar loads to gather the operational data that is compared to operational data from previous tests during manufacturing, configuration, etc. that was previously stored as VPD. The method 300 compares 304 the current operational data with operational data in the VPD to identify degradation of the core 126*a*, to determine if the core 126*a* is defective and/or to determine if one or more units in the core 126*a* are defective to find a root cause of the failure that triggered the failure notification. In some embodiments, degradation of the core 126*a* includes critical paths across units. In some examples, the critical path indicates operation slower than expected, a data error in the critical path, the core 126*a* consuming more power than expected for a given TPF workload, and the like. A defective unit in the core 126 typically includes some type of localized failure, such as a logic error, a timing problem, a process defect, etc. In some embodiments, the method 300 uses targeted testing based on a failure signature reported with the failure notification to identify a degradation or failure.

The method 300 runs 306 one or more tests to identify a failure in response to determining that the core 126*a* is in a degraded state, the core 126*a* is defective or a unit of the core 126*a* is defective. In some examples, the method 300 uses targeted testing based on results of comparing 304 operational testing with operational data in the VPD. The method 300 adjusts 308 one or more parameters of the core 126a in response to a test identifying a failure of the core 126a and re-evaluates 310 the core 126a to determine if the core 126a is functional.

The method 300 determines 312 if the core 126a is functional. For example, the method 300 may determine 312 if the core 126a is functional by determining if there is degradation in the core 126a, that the core 126a is defective and/or if a unit of the core 126a is defective. If the method 300 determines 312 that the core 126a is functional, the method 300 returns 314 the core 126 to service, and the method 300 ends. If the method 300 determines 312 that the core 126a is not functional, the method 300 fences 318 off the core 126a so that the core 126a is not used, and the method 300 ends. The FAR probe 102, in some embodiments, the FAR probe 102 implements one or more steps of the method 300.

Figure 4A:
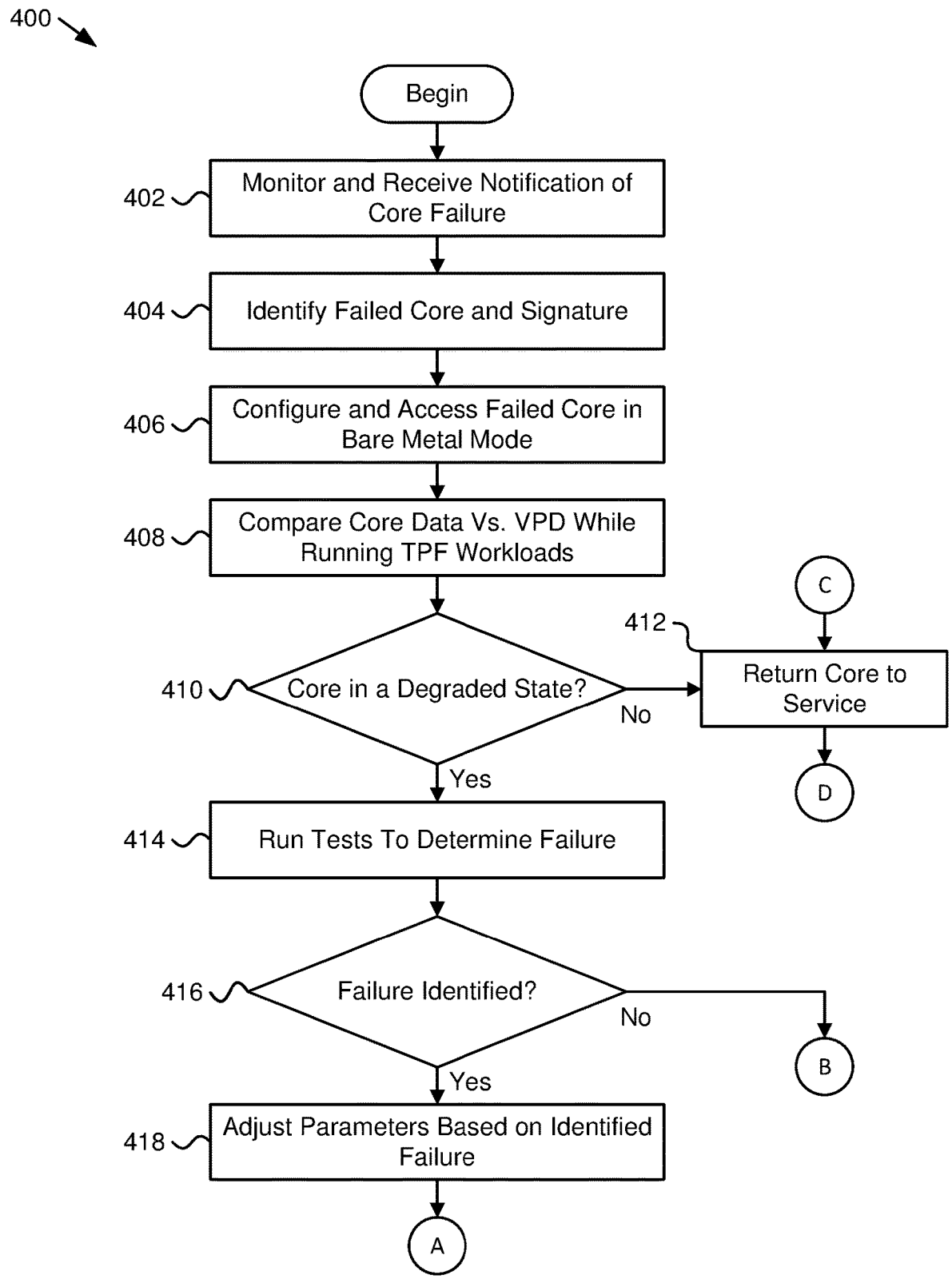
FIG. 4A is a first part of a schematic flow chart diagram illustrating another embodiment of a method for core repair using a FAR probe.
Figure 4B:
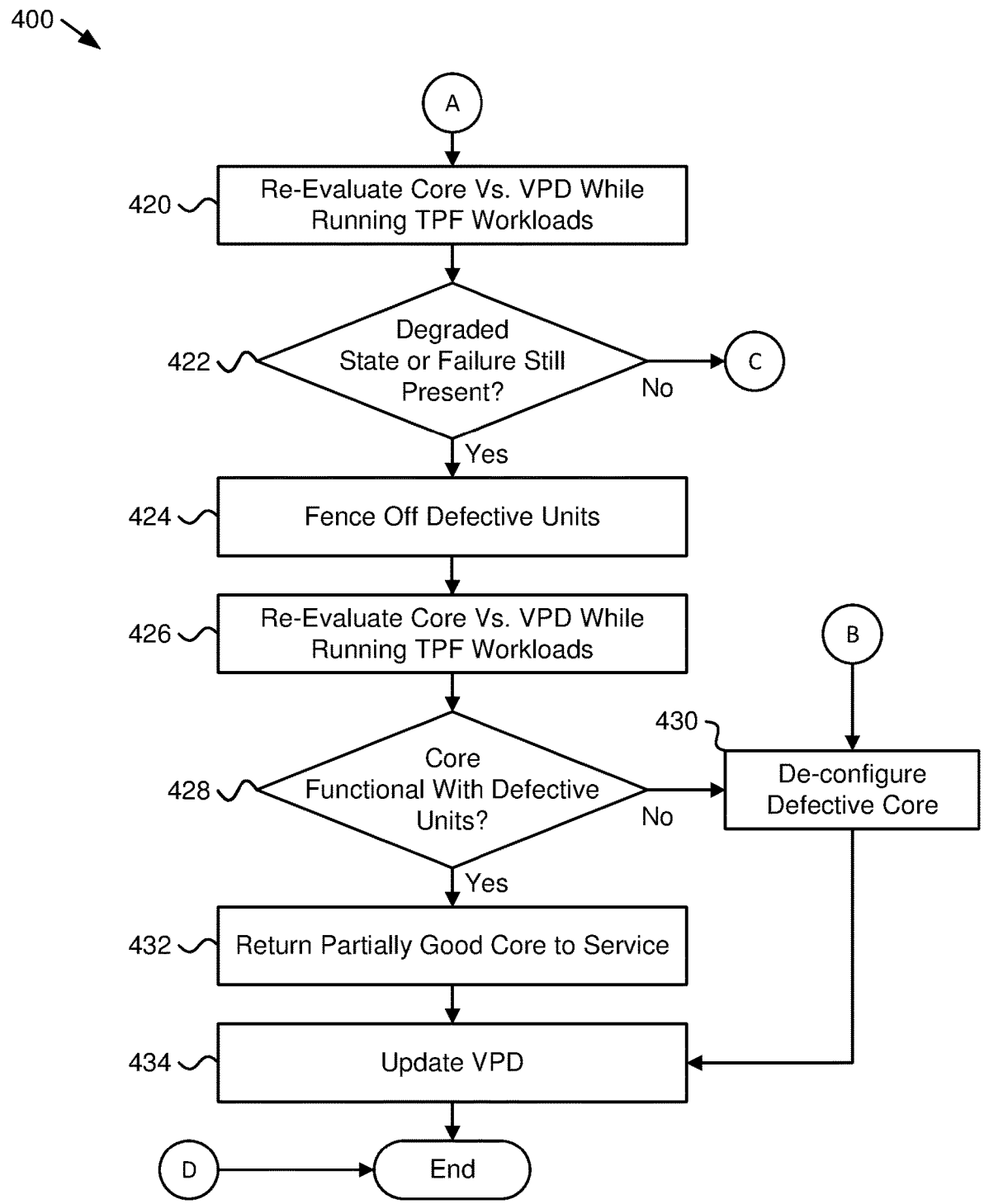
FIG. 4B is a second part of the schematic flow chart diagram illustrating another embodiment of the method for core repair using the FAR probe.

FIG. 4A is a first part and FIG. 4B is a second part of a schematic flow chart diagram illustrating another embodiment of a method 400 for core repair using a FAR probe 102. The method 400 begins and monitors and receives 402 a core failure notification. For example, the core failure notification may come from the computer system 106, the system hypervisor 120, a client, etc. The method 400 identifies 404, in some embodiments, the failed core 126a and a failure signature. In some examples, the method 400 identifies 404 the failed core 126a from the failure notification. In other examples, the method 400 identifies a failure signature from the failure notification. In other embodiments, the identification of the failed core 126a and/or failure signature come from another source.

The method 400 configures and accesses 406 the failed core of a processor 114 and units of the core 126a over a low-level communication bus while the core 126a is operational in response to the failure notification regarding the core 126a and/or a unit of the core 126a. The method 400 configures and/or accesses 406 the failed core 126a in bare metal mode. The method 400 compares 408 operational data present in the core 126a versus VPD of the core 126a while the core 126a is running tests and a TPF workload to determine if the core 126 is in a degraded state and/or a unit of the core 126a or the core 126a is defective. Comparing 408 operational data present in the core 126a versus the VPD includes evaluating a power budget, evaluating operation with respect to a guard band, evaluating operational data of the core 126a with respect to manufacturing limits in the VPD, evaluating timing of the core 126a, evaluating frequency of the core 126a, evaluating voltage of the core 126a, evaluating temperature of the core 126a, and the like.

The method 400 determines 410 if the core 126a is in a degraded state. As used herein, the core 126a being in a degraded state includes that the core 126a is degraded, that the core 126a is defective or that a unit of the core 126a is defective. The core 126a being degraded includes, in some embodiments, that the core 126a is operating over a power budget, is operating too hot, is operating slower than expected, and the like. The core 126a being defective includes a failure of the core 126a, the core 126a not being able to perform a particular function, etc. A unit of the core 126a being defective includes a particular unit of the core 126a not functioning as expected. The core 126a being in a degraded state includes errors, problems, the core 126a being out of spec, the core 126a returning an error notification, and other core problems known to those in the art.

In some embodiments, the method 400 reassigns workloads assigned for execution by the core 126a identified in the failure notification to be executed by a different core (e.g. 126b or a core 126 in another processor 114) while the method 400 determines if the core 126a identified in the failure notification can be returned to service. The core 126a remains operational during the workload reassignment and subsequent running of TPF workloads without rebooting the core 126a and/or processor 114. For example, the method 400 and/or the FAR probe 102 accesses the core 126a, compares 408 data, runs 414 one or more tests, adjusts 418 parameters, re-evaluates 420 the core and returns 412, 432 the core 126a to service without re-booting the core 126a and/or processor 114.

If the method 400 determines 410 that the core 126a is not in a degraded state, the core 126a is not defective or a unit of the core 126a is not defective, the method 400 returns 412 the core 126a to service, and the method 400 ends (follow D on FIG. 4A to D on FIG. 4B). If the method 400 determines 410 that the core 126a is in a degraded state, the core 126a is defective or a unit of the core 126a is defective, the method 400 runs 414 one or more tests to identify a failure. For example, the method 400 runs 414 one or more tests that target various areas of the core 126a, that target one or more units of the core 126a, etc. For example, the method 400 runs 414 root cause analysis for the core 126a. The root cause analysis may use diagnostics, test methods, etc. that focus on identifying a defective unit or a degraded state of the core 126a where a critical path causing the failure involves multiple units of the core 126a.

The one or more tests typically include low-level testing used to establish the VPD, testing when the core 126a is configured, or the like. In one example, the one or more tests includes tuning a voltage and/or a frequency of the core 126a to achieve a functional dynamic voltage frequency slewing ("DVFS") point. For example, the method 400 may vary voltage, vary frequency, or both to find a functional DVFS point where voltages, frequencies, timing, etc. are within guard bands in the VPD. In other embodiments, the method 400 adjusts temperature and/or power while tuning a voltage and/or a frequency of the core to achieve a functional DVFS point.

In other embodiments, the one or more tests include running a test based on a failure signature present in the failure notification and/or a failure signature identified when determining if the core 126a is in a degraded state. For example, the failure signature may identify that a particular unit of the core 126a is defective. The method 400, in some embodiments, runs one or more tests on the failed unit to determine if the failed unit is still in a failed state. In other embodiments, the identified failure from the failure signature is a deficiency in a critical path, such as a timing deficiency. The method 400 may then runs specific tests on the critical path to determine if the failure is still present.

In other embodiments, the one or more tests includes measuring, under a specific workload, such as a TPF workload, circuit timing of a unit in the core 126a to identify a critical timing path. For example, the testing may identify that the critical timing path is running slower so that the timing is outside a guard band associated with the critical timing path. One of skill in the art will recognize other tests for identifying a timing issue in a core 126a.

In other embodiments, the one or more tests includes measuring voltages of the core 126a to identify a voltage deficit with respect to a known critical path limiter. For example, the test may reveal that a voltage of a unit is low or high with respect to a guard band in the VPD. In other embodiments, the one or more tests includes running an architected verification pattern ("AVP") test, running a logic built in self test ("ABIST"), running an architect-targeted low-level test, or the like. The tests listed above are not intended to be all inclusive or limiting and one of skill in the art will recognize other tests that will identify a failure of the core 126a and/or a unit in the core 126a.

The method 400 determines 416 if a failure is identified from results of the method 400 running 414 the one or more tests. For example, the method 400 determines 416 a root cause of the identified failure. If the method 400 determines 416 that a failure is identified, the method 400 adjusts 418 parameters based on the identified failure. The parameters may be control parameters, operational parameters, etc. based on the identified root cause of the failure. For example, if the identified failure is a timing problem in the critical path, the method 400 may adjust 418 a frequency to resolve the timing problem. For instance, the method 400 many lower a clock frequency to allow circuits in the critical path more time for propagation delay to resolve the timing problem. In other embodiments, the method 400 adjusts 418 one or more voltages. For example, the tests may identify a voltage problem within a unit and the method 400 then adjusts 418 a voltage source so that a voltage in the unit is within a guard band for the unit.

In other embodiments, the method 400 adjusts 418 a guard band of the VPD to resolve the failure. For example, a maximum voltage from a manufacturer for a unit may be 7 volts ("V") and the guard band for the unit may be 2 V so that a voltage over 5 V will be in the guard band. Testing may indicate that voltage in the unit is 5.1 V and to extend life of the core 126a, the guard band may be adjusted to 5.5V where there is still an acceptable a guard band between an allowable operating point and a manufacturing maximum voltage. One of skill in the art will recognize other parameters and allowable adjustments based on an identified failure.

The method 400 re-evaluates 420 the core 126a (follow A on FIG. 4A to A on FIG. 4B) to determine if the core 126a is functional. For example, the method 400 re-evaluates 420 the core 126a by re-running a specific test that identified the failure after adjustment 418 of the one or more parameters to determine if the identified failure is still present. In another embodiment, the method 400 re-evaluates 420 the core 126a by evaluating operational data from the core 126a versus VPD while running the TPD workload to determine if the core is no longer in the degraded state. If the method 400 determines 422 that the core 126a is still in a degraded state and/or the identified failure is still present, the method 400 fences off 424 one or more defective units and re-evaluates 426 operational data of the core 126a versus VPD while running the TPD workloads and determines 428 if the core 126a is partially functional with the defective units fenced off.

In another embodiment, the method 400 adjusts 418 parameters, re-evaluates 420 the core, and determines 422 if the core 126a is in a degraded state or a failure is still present multiple times before fencing 424 off defective units, returning the core 126a to service, etc. (Note that repeating adjusting 418 parameters, re-evaluating 420 the core 126a, etc. is not explicitly shown in FIGS. 4A and 4B but is contemplated herein.)

In some embodiments, the method 400 disables and/or fences off 424 specific defective units where the core 126a is still functional by altering operation of the core 126a. For example, method 400 may disable a specific unit in the core 126a that could be disabled and that only impacts a specific feature. For example, a double word precision unit may be failing while single precision still works so the method 400 disables double word precision. In another example, a thread slice may be failing while other thread slices may still be operational so the method 400 fences 424 off the failing thread slice (e.g. simultaneous multithreading ("SMT") 8 may be failing while SMT4 is operational). In another example, a shared cache unit may be failing so the method 400 fences 424 off the shared cache and configures the core 126a to cast to another cast or another core 126.

If the method 400 determines 428 that the core 126a is not functional with the defective units fenced off, the method 400 de-configures 430 the defective core 126a and updates 434 the VPD appropriately and the method 400 ends. For example, the method may update 434 the VPD to indicate that the core 126a is not functional. If the method 400 determines 428 that the core 126a is functional with the defective units fenced off, the method 400 returns 432 the partially good core to service and updates 434 the VPD data, and the method 400 ends. For example, the method 400 may update the VPD data to indicate that the core 126a is partially functional so that that the features that are not usable so the system hypervisor 120 knows to assign threads, applications, etc. that are able to run on the partially operational core 126a without fully disabling the core 126a.

In other embodiments, the method 400 fences 424 off the core 126a and de-configures 430 the core 126a, but allows some units within the core 126a to continue to function to be used by the active cores 126b-f. In one example, when critical units to the operation of the core 126a are defective such as the instruction sequence unit, the method 400 allows use of common units that are shared with other cores 126b-f and are still operable, such as shared caches (e.g. level 2 or 3). In the example, the units remain operable and online.

If the method 400 determines 416 that the failure cannot be identified, the method 400 de-configures 430 the defective core 126a and updates 434 the VPD appropriately and the method 400 ends. If the method 400 determines 422 that the core 126a is not still in a degraded state and/or the identified failure is not still present, the method 400 returns 412 the core 126a to service (follow C on FIG. 4B to C on FIG. 4A) and the method 400 ends (follow D on FIG. 4A to D on FIG. 4B).

In some embodiments, the FAR probe 102 executes one or more of the steps of the method 400. While the FAR probe 102 and/or method 400 is functioning, the FAR probe 102 operates independent of cores 126 of the processor 114 while the cores 126 of the processor 114 are operational. For example, the identified failed core 126a may operate to execute TPF workloads while one or more of the other cores (e.g. 126b-f) are executing client workloads.

Beneficially, the methods 300, 400 and/or FAR probe 102 provide a way to repair a core 126 without returning to a known good operating point and rebooting the core 126 and/or processor 114, as required by other prior art methods. In addition, the FAR probe 102 provides a way to test and repair a core (e.g. 126a) without relying on another core (e.g. 126f) being a spare and running diagnostics, testing, adjusting parameters, etc. Advantageously, the methods 300, 400 and/or FAR probe 102 allow repair of a core 126a while the other cores 126b-f are operational and processing client workloads.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a failure analysis and recovery ("FAR") probe that:
accesses a core of a processor and units of the core over a low-level communication bus while the core is operational in response to a failure notification regarding one or more of the core and a unit of the core;
compares operational data present in the core versus vital product data ("VPD") of the core while the core is running tests and a thermal, power and functional ("TPF") workload to determine if the core is in a degraded state;
runs one or more tests to identify a failure in response to determining that the core is in a degraded state;
adjusts one or more parameters of the core in response to a test identifying a failure of the core;
re-evaluates the core to determine if the core is functional; and
returns the core to service in response to determining that the core is functional,
wherein the FAR probe operates independent of cores of the processor while the cores of the processor are operational.

2. The apparatus of claim 1, wherein the FAR probe returns the core to partial service and updates the VPD in response to the FAR probe:
adjusting the one or more parameters of the core and determining that the core is partially functional; and
fencing off one or more components of the core deemed non-functional.

3. The apparatus of claim 1, wherein the FAR probe fences off the core and updates the VPD in response to the FAR probe adjusting the one or more parameters of the core and determining that the core is non-functional.

4. The apparatus of claim 1, wherein the FAR probe returns the core to service in response to running the one or more tests and determining that the core is not in a degraded state.

5. The apparatus of claim 1, wherein the degraded state comprises one or more of:
the operational data present in the core being outside of manufacturing limits in the VPD;
the operational data present in the core being outside a guard band in the VPD;
determining that the core is in a failed state; and
determining that a unit in the core is in a failed state.

6. The apparatus of claim 1, wherein the one or more tests comprise one or more of:
tuning one or more of a voltage and a frequency of the core to achieve a functional dynamic voltage frequency slewing ("DVFS") point;
adjusting one or more of temperature and power while tuning one or more of a voltage and a frequency of the core to achieve a functional DVFS point;
running a test based on one or more of a failure signature present in the failure notification and a failure signature identified when determining if the core is in a degraded state;
measuring, under a specific workload, circuit timing of a unit in the core to identify a critical timing path;
measuring voltages of the core to identify a voltage deficit with respect to a known critical path limiter;
running an architected verification pattern ("AVP") test;
running a logic built in self test ("ABIST"); and
running an architect-targeted low-level test.

7. The apparatus of claim 6, wherein re-evaluating the core comprises one or more of re-running a specific test that identified the failure after adjustment of the one or more parameters to determine if the identified failure is still present and evaluating the core versus VPD while running the TPD workload to determine if the core is no longer in the degraded state.

8. The apparatus of claim 1, wherein the FAR probe accesses the core in bare metal mode using a bare metal kernel.

9. The apparatus of claim 1, wherein the low-level communication bus is independent of a communication bus used by the processor to service client workloads.

10. The apparatus of claim 1, wherein adjusting the one or more parameters of the core comprising adjusting one or more guard bands of the core.

11. The apparatus of claim 1, wherein the FAR probe reassigns workloads assigned for execution by the core identified in the failure notification to be executed by a different core while the FAR probe determines if the core identified in the failure notification can be returned to service.

12. The apparatus of claim 1, wherein the FAR probe accesses the core, compares data, runs one or more tests, adjust parameters, re-evaluates the core and returns the core to service without re-booting the core.

13. The apparatus of claim 1, wherein comparing operational data present in the core versus the VPD comprises one or more of evaluating a power budget, evaluating operation with respect to a guard band, evaluating operational data of the core with respect to manufacturing limits in the VPD, evaluating timing of the core, evaluating frequency of the core, evaluating voltage of the core, and evaluating temperature of the core.

14. The apparatus of claim 1, wherein the FAR probe accesses one or more of a state machine and a control register through pervasive logic to one or more of:
compare the operational data present in the core versus the VPD;
run the one or more tests;
adjust the one or more parameters; and
re-evaluate the core.

15. The apparatus of claim 1, wherein the FAR probe accesses the core identified in the failure notification using a hardware interface.

16. A method comprising:
accessing a core of a processor and units of the core over a low-level communication bus while the core is operational in response to a failure notification regarding one or more of the core and a unit of the core;
comparing operational data present in the core versus vital product data ("VPD") of the core while the core is running tests and a thermal, power and functional ("TPF") workload to determine if one or more of the core is in a degraded state;
running one or more tests to identify a failure in response to determining that the core is in a degraded state;
adjusting one or more parameters of the core in response to a test identifying a failure of the core;
re-evaluating the core to determine if the core is functional; and
returning the core to service in response to determining that the core is functional, wherein a failure analysis and recovery ("FAR") probe executing the method operates independent of cores of the processor while the cores of the processor are operational.

17. The method of claim 16, further comprising returning the core to partial service and updating the VPD in response to:
adjusting the one or more parameters of the core and determining that the core is partially functional; and
fencing off one or more components of the core deemed non-functional.

18. The method of claim 16, further comprising fencing off the core and updating the VPD in response to adjusting the one or more parameters of the core and determining that the core is non-functional.

19. The method of claim 16, further comprising returning the core to service in response to running the one or more tests and determining that the core is not in a degraded state.

20. A system comprising:
a processor comprising two or more cores;
memory accessible by the processor, wherein the processor and memory are configurable in logical partitions accessible by a client;
pervasive logic within the processor; and
a failure analysis and recovery ("FAR") probe external to the processor that accesses the cores of the processor via the pervasive logic to:
access a core of a processor and units of the core over a low-level communication bus of the pervasive logic while the core is operational in response to a failure notification regarding one or more of the core and a unit of the core;
compare operational data present in the core versus vital product data ("VPD") of the core while the core is running tests and a thermal, power and functional ("TPF") workload to determine if one or more of the core is in a degraded state;
run one or more tests to identify a failure in response to determining that the core is in a degraded state;
adjust one or more parameters of the core in response to a test identifying a failure of the core;
re-evaluate the core to determine if the core is functional; and
return the core to service in response to determining that the core is functional,
wherein the FAR probe operates independent of cores of the processor while the cores of the processor are operational.

* * * * *